United States Patent [19]
Hsu et al.

[11] Patent Number: 5,646,379
[45] Date of Patent: Jul. 8, 1997

[54] ATTENTUATOR FOR BOREHOLE ACOUSTIC WAVES

[75] Inventors: Chuar-Jian Hsu, Danbury; David L. Johnson, Bethel; Sergio Kostek, Ridgefield, all of Conn.; Abderrhamane Ounadjela, Paris, France

[73] Assignee: Schlumberger Technology Corporation, Ridgefield, Conn.

[21] Appl. No.: 527,736

[22] Filed: Sep. 13, 1995

[51] Int. Cl.⁶ .................................. G01V 1/00
[52] U.S. Cl. .................. 181/101; 181/106; 367/25; 367/37; 175/50; 166/250.01
[58] Field of Search ................... 181/101, 106, 181/105, 108; 367/25, 37, 75, 31; 175/50; 166/250.01

[56] References Cited

U.S. PATENT DOCUMENTS

| | | | |
|---|---|---|---|
| 4,671,379 | 6/1987 | Kennedy et al. | 181/106 |
| 4,858,718 | 8/1989 | Chelminski | 181/106 |
| 4,993,001 | 2/1991 | Winbow et al. | 367/144 |
| 5,005,666 | 4/1991 | Fairbom | 181/102 |
| 5,170,018 | 12/1992 | Potier | 181/101 |

FOREIGN PATENT DOCUMENTS

| | | | |
|---|---|---|---|
| 2253054 | 5/1992 | United Kingdom | G01V 1/40 |

OTHER PUBLICATIONS

S. T. Chen, "A Single-Well Profiling Tool and Tube Wave Suppression" Expanded Abstract, SEG, 13–16, 1993.
W. T. Balogh, "The Borehole Tubewave Damper Probe" Expanded Abstract, SEG, 159–162, 1992.
L. D. Pham, C. E. Krohn, T. J. Murray and S. T. Chen, "A Tube Wave Suppression Device for Cross-Well Applications" Expanded Abstract, SEG, 17–20, 1993.

Primary Examiner—J. Woodrow Eldred
Attorney, Agent, or Firm—Brigitte L. Jeffery; Martin D. Hyden

[57] ABSTRACT

An attenuator for use in attenuating tube waves in a borehole includes a body formed from a permeable material having a rigid matrix which can be saturated with fluid. In its simplest form, the attenuator is one or more cylindrical bodies as part of a borehole acoustic logging system. Alternatively, the shape, particularly at the end regions, can be modified to reduce the amount of reflection of tube waves in the borehole. Another attenuator includes a body for placement in a borehole formed from an attenuating material, the shape of the body being selected such that the change in impedance experienced by acoustic waves in the borehole is gradual rather than abrupt. One particularly preferred shape for the body comprises one in which the diameter is greatest towards the center of the body, for example the shape formed by two cones placed base to base, or a cylinder having conically tapered ends. A number of bodies can be used where appropriate.

20 Claims, 3 Drawing Sheets

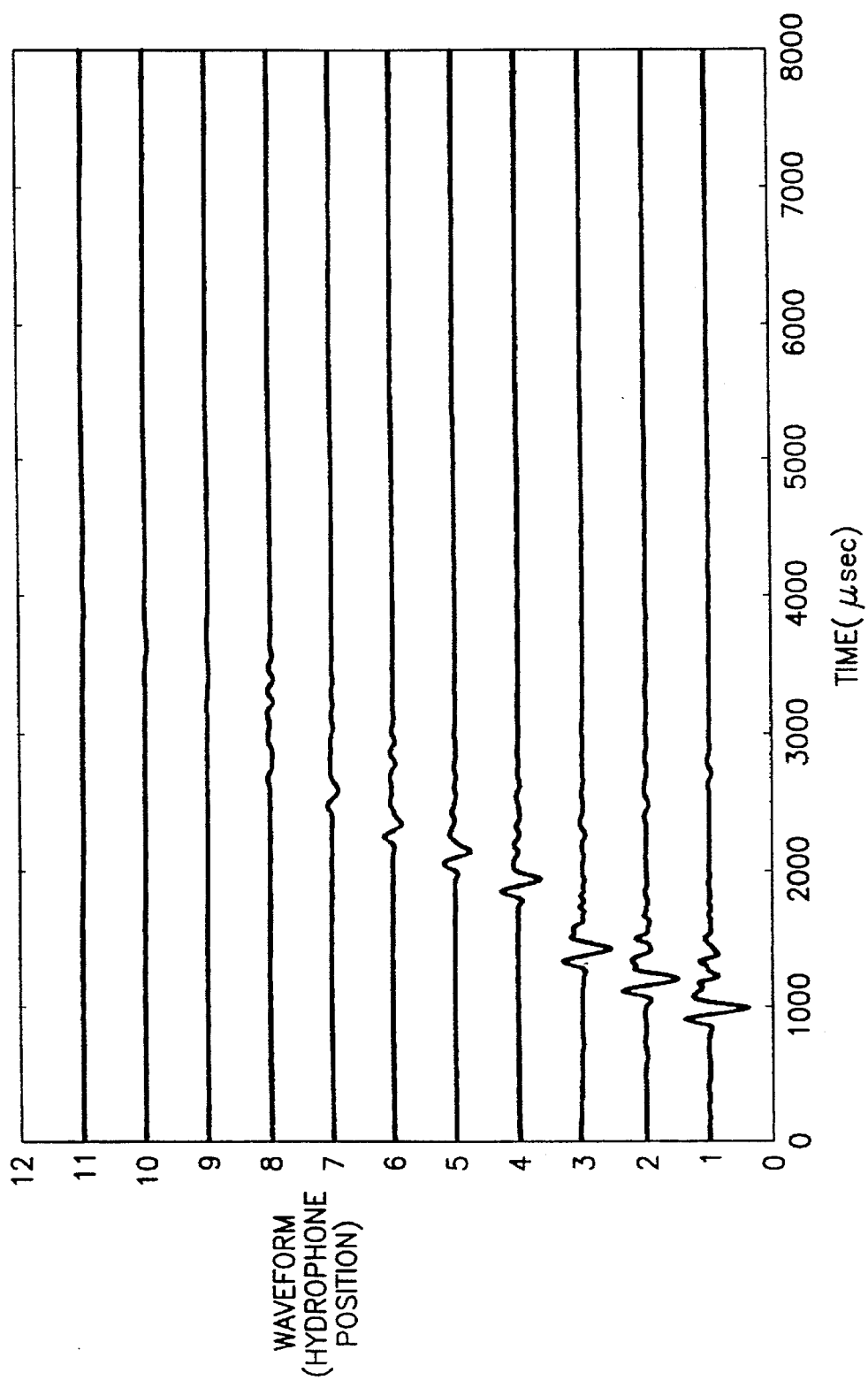

ATTENTUATOR FOR BOREHOLE ACOUSTIC WAVES

FIELD OF THE INVENTION

The present invention relates to an attenuator for acoustic waves in a borehole and in particular to a borehole logging tool incorporating such an attenuator.

BACKGROUND OF THE INVENTION

In borehole acoustic logging techniques, acoustic signals are generated by a source in the fluid filled borehole, propagate through various paths including the formation and borehole fluid, and are detected at a receiver in the borehole spaced from the source. The source and receiver are typically suspended from a wireline cable or coil tubing. Such techniques can be used for characterizing the formation around the borehole or for imaging the surrounding structures. In examples such as these, tube waves (Stoneley waves) which travel along the borehole are often the most energetic part of the received waveform and can interfere with signals of interest such as flexural mode signals or reflected formation compressional waves.

Various methods have been proposed previously to attenuate tube waves passing along the borehole from the source to the receiver and so reduce the interfering effect. Such methods rely on placing an attenuator in the borehole between the source and receiver. One form of attenuator which has been proposed for use in borehole seismic systems is one or more inflatable bladders which are positioned in the borehole such as is described in U.S. Pat. No. 4,858,718 or U.S. Pat. No. 5,005,666. The bladders are inflated with gas to fill the borehole and provide acoustic isolation between the source and receiver. The bladders are provided with a supply of pressurized gas for inflation. This supply can be a container located downhole or a supply line from the surface. In either case, some control mechanism is required to allow inflation and deflation of the bladder for the desired depth of measurement. The bladder serves to reflect rather than dissipate the tube wave energy.

An alternative form of tube wave attenuator is disclosed in S T Chen, "A Single-Well Profiling Tool and Tube Wave Suppression" Expanded Abstract, SEG, 13–16, 1993 and in W T Balogh, "The Borehole Tubewave Damper Probe" Expanded Abstract, SEG, 159–162, 1992, which describe a probe which uses a Helmholtz resonator of high compliance to approximate a high-pass filter of borehole acoustic disturbances which pass the probe. The high compliance results from a gas-filled bladder which fills partially the Helmholtz resonator which comprises a cylindrical steel shell. The bladder is inflated at the surface to a pressure slightly below the ambient hydrostatic pressure in the borehole at the depth of interest and is then lowered into the well for use. This probe is a tube wave reflector and the operating depth depends on the precharge pressure of the bladder.

A still further approach to the problem of tube wave attentuation is proposed in L D Pham, C E Krohn, T J Murray and S T Chen, "A Tube Wave Suppression Device for Cross-Well Applications" Expanded Abstract, SEG, 17–20, 1993. This document describes the use of a cylindrical porous but impermeable body between the source and receivers. Material which is proposed for such use is a material called "syntactic foam". UK Patent Application GB 2253054 describes the use of cork, an absorptive, compressible material, in the form of disks and balls as an attenuator. The effectiveness of both cork and syntactic foam is depth dependent.

It is an object of the invention to provide an effective tube wave attenuator for use in borehole apparatus.

SUMMARY OF THE INVENTION

The present invention comprises an attenuator for use in attenuating tube waves in a borehole. In its broadest aspect, the attenuator comprises a body formed from a permeable material having a rigid matrix which can be saturated with fluid. This can be positioned in the borehole to attenuate tube waves traveling along borehole such as may access in an acoustic borehole logging operation.

The permeable material is selected so as to allow coupling of tube waves into slow waves, in the sense of the Biot theory, in the attenuator. These slow waves are highly attenuated. In order for this coupling to be effective, it is necessary that the material be permeable, i.e., have a connected porous structure, and have a substantially rigid matrix material. Consequently, the material should be substantially self-supporting. A suitable material is permeable rock or a synthetic rock-like material, e.g. a sintered granular material.

In order to achieve consistent attenuation, it may be desirable to saturate the attenuator with a fluid of selected viscosity and sound speed. In such cases, the solid body may be enclosed in a flexible sheath. This sheath can also assist in protecting the attenuator against physical damage. A cage or perforated shell might also be used to surround the attenuator to improve protection.

In its simplest form, the attenuator is one or more cylindrical bodies as part of a borehole acoustic logging system. Alternatively, the attenuator can be modified to match the impedance of the adjacent tool body to reduce the amount of reflection of tube waves near its ends. The impedance match can be improved by, for example, a gradual change of the permeability of the mandrel, a gradual change of the openings in the protective sleeve, or a tapered end. Another aspect of the invention comprises an attenuator comprising a body for placement in a borehole formed from an attenuating material, the shape of the body being selected such that the change in impedance experienced by acoustic waves in the borehole is gradual rather than abrupt. One particularly preferred shape for the body comprises one in which the diameter is greatest towards the center of the body, for example the shape formed by two cones placed base to base, or a cylinder having conically tapered ends. A number of bodies can be used where appropriate.

BRIEF DESCRIPTION OF THE DRAWINGS

The present invention will now be described by way of example, with reference to the accompanying drawings, in which:

FIG. 6 shows a plot of waveforms around an attenuator in the borehole; and

DESCRIPTION OF THE PREFERRED EMBODIMENT

Figure 1:
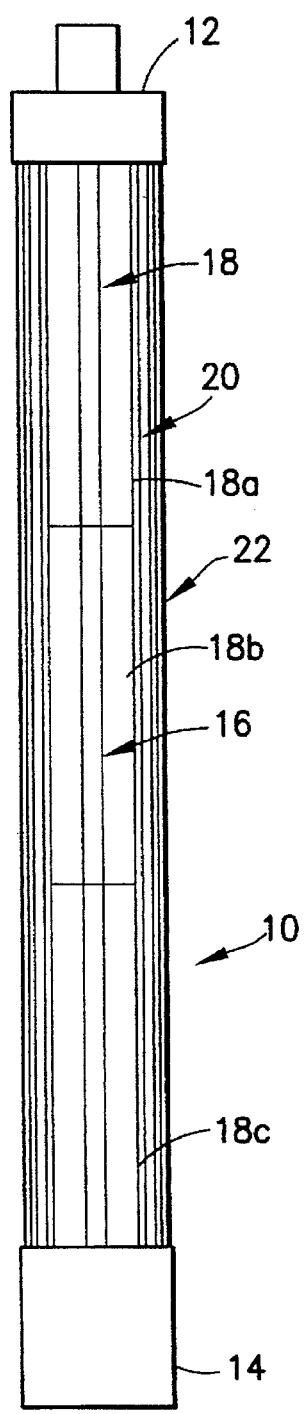
FIG. 1 shows a schematic view of an attenuator according to one embodiment of the present invention.

Referring now to FIG. 1, the attenuator shown therein comprises an elongate body 10 having field joints 12, 14 at either end thereof. The field joints facilitate connection to other tool parts to create a tool string for use in a borehole. A central tube 16 extends between the field joints 12, 14 to provide a conduit through which wire conductors for power, control signals and/or data signals can pass so as to allow communication between either side of the attenuator.

The attenuating effect is provided by a mandrel 18 disposed around the central tube 16. In the present case, the mandrel is composed of three sections 18a, 18b, and 18c, although any number of sections can be used depending on the nature of the attenuating material. Where more than one mandrel section is used, the sections can be separated by spacers such as rubber sheets, if required. In this example, the mandrel is formed from Berea sandstone which is machined to shape. To be effective as an attenuator, the material must be permeable and have a substantially rigid matrix. The matrix, and consequently the mandrel as a whole, should have insignificant compressibility under typical borehole pressures. As has been stated above, natural rocks such as Berea sandstone are potentially suitable materials. Synthetic, rock-like materials also may have suitable properties. Such synthetic materials can comprise, inter alia, sintered or bonded sand grains or sintered aluminum spheres.

The material of the mandrel is saturated with a fluid of suitable viscosity. The actual viscosity of the fluid used can vary since the attenuating effect depends on both the permeability of the material and the viscosity of the fluid. In the case of natural materials, the fluid may have substantially the same viscosity as formation fluid or borehole fluid (e.g. water or brine). The optimum viscosity of the fluid used to saturate the mandrel can be calculated according to Biot theory.

A flexible boot 20 surrounds the mandrel 18 and is connected to the field joints 14, 16 so as to prevent fluid from passing between the mandrel 18 and the borehole. The boot 20 is relatively loose fit and is sufficiently flexible that borehole pressure is transmitted to the fluid saturating the mandrel. Suitable material for the boot 20 includes natural or synthetic rubber.

Figure 2:
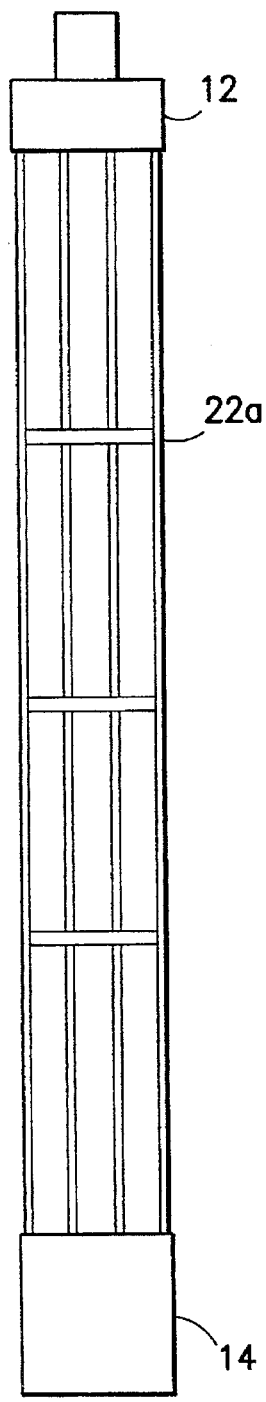
FIGS. 2 and 3 show protective cages and sleeves for use in the embodiment of FIG. 1.
Figure 3:
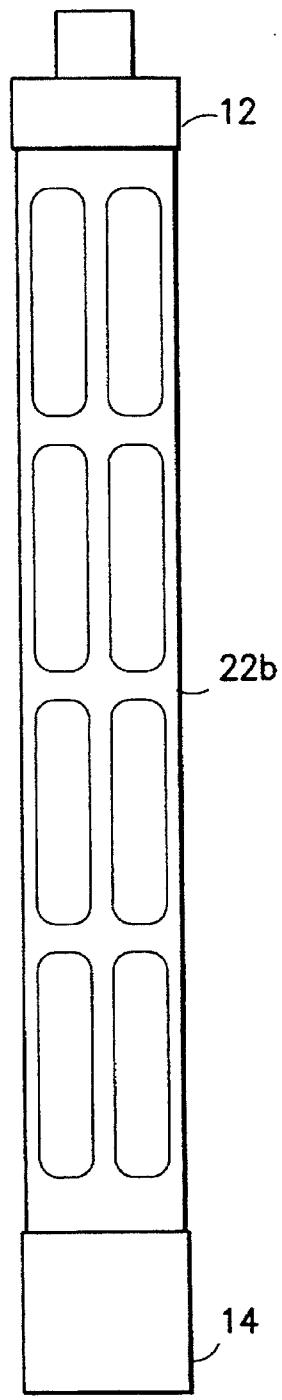

The mandrel 18 and boot 20 are encased in a protective cage 22(a) or slotted sleeve 22(b) (see also FIGS. 2 and 3). This protects the mandrel 18 and boot 20 from physical damage in use while allowing pressure communication from the borehole to the mandrel 18. When complete, the attenuator has an outer diameter which is substantially similar to that of borehole sonic logging tools.

The attenuator described above is entirely passive in its effect. It requires no power to operate and need only be placed at a suitable place in a tool string. The attenuator performance is substantially insensitive to depth with no setting or pressurizing in advance depending on the depth at which it is to be used. A mandrel of uniform permeable material and of simple cylindrical shape has been described but it may also be possible to use gradually varied permeable material, gradually varied openings of the protective sleeve, or tapered shapes near the ends to reduce the reflection from the ends of the attenuator.

Figure 4:
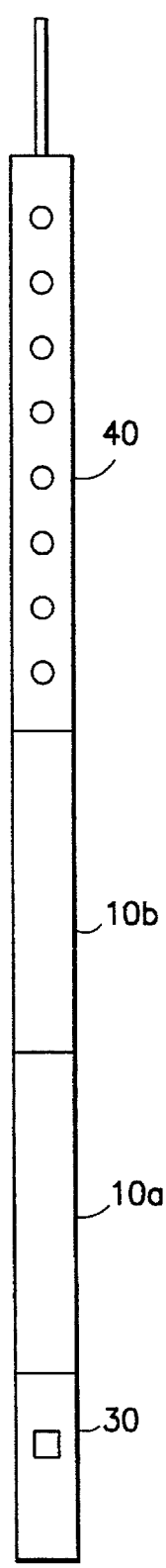
FIGS. 4 and 5 show embodiments of sonic tool strings incorporating the present invention.
Figure 5:
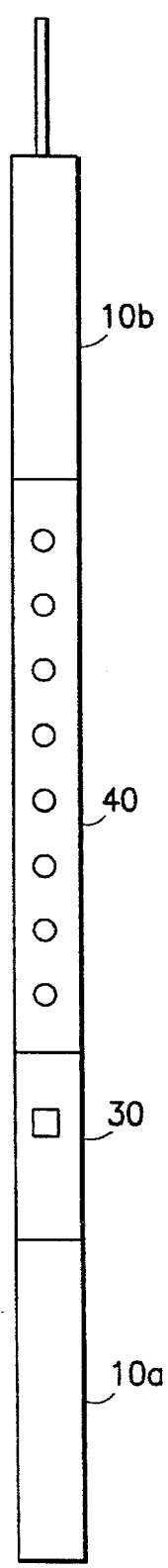

The attenuator of FIG. 1 can be incorporated into a sonic logging tool string in various ways, two of which are shown in FIGS. 4 and 5. FIG. 4 shows an arrangement for use in sonic formation measurements and comprises a transmitter section 30 and a receiver section 40 separated by two attenuator modules 10a, 10b disposed therebetween. Each of the attenuator modules 10a, 10b is substantially as described in relation to FIG. 1. A borehole sonic logging tool incorporating a suitable transmitter 30 and receiver section 40 is described in co-pending application Ser. No. 08/527,735, abandoned in favor of FWC Ser. No. 08/816,475 (incorporated herein by reference). The presence of the attenuators is effective in preventing propagation of tube waves from the transmitter to the receiver which would interfere with the detection and analysis of formation signals.

The arrangement shown in FIG. 5 can be used for sonic imaging. A borehole sonic imaging tool incorporating a suitable transmitter and receivers is described in co-pending application Ser. No. 08/527,735, abandoned in favor of FWC Ser. No. 08/816,475 (incorporated herein by reference). In this case, the transmitter 30 and receiver 40 are placed adjacent to each other and the attenuators 10a, 10b are placed on either side. In this case, the attenuator reduce the propagation of tube waves along the borehole away from the tool so as to reduce the likelihood of reflections from other structures in the borehole back to the receiver. The attenuators also reduce the effect of any reflected signals which do return to the tool.

Operation of the attenuators described above can be illustrated experimentally. An attenuator is made of Berea sandstone cylinders of 3 in diameter with an overall length of 5 ft, saturated in water and contained in a rubber boot. This attenuator is suspended in a borehole above an acoustic source at a depth of 100 ft. Hydrophones are placed below, alongside and above the attenuator to record acoustic waveforms. The waveforms obtained in the experiment are shown in FIG. 6. The y-axis of this plot indicates hydrophone position in the well from which the waveform is obtained. Waveforms 1, 2 and 3 are obtained from hydrophones above the source and below the attenuator, waveforms 4 to 8 are obtained from hydrophones adjacent to the attenuator and waveforms 9 to 11 are obtained from hydrophones above the attenuator. As can be seen, the amplitude of the recorded waveforms decreases rapidly adjacent to the attenuator indicating effective attenuation of the tube waves.

Figure 7:
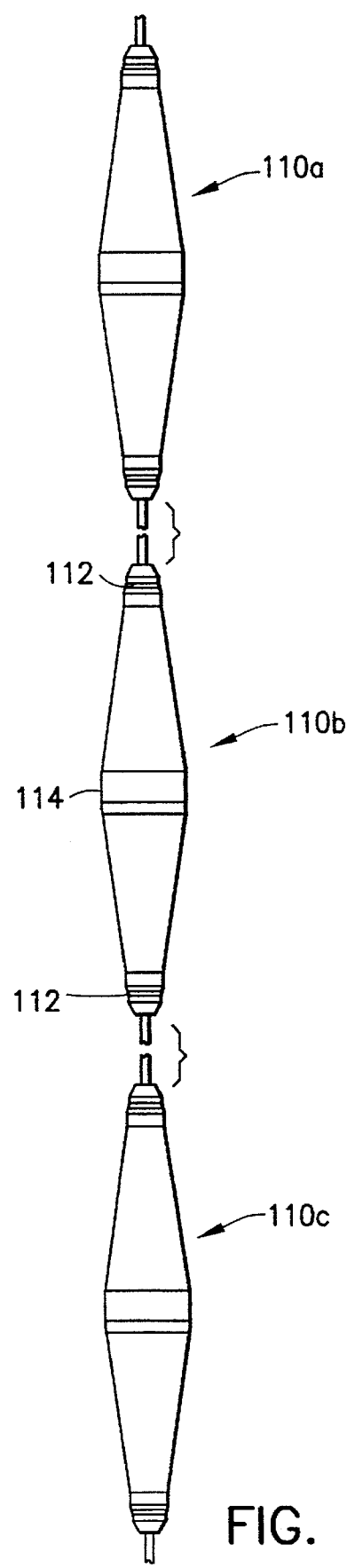
FIG. 7 shows another embodiment of an acoustic attenuator for use in a borehole.

FIG. 7 shows a further form of acoustic attenuator for reducing propagation of tube waves in a borehole. In this case, three attenuator modules 110a, 110b, 110c are disposed in the borehole between the acoustic source and receiver. Each module comprises an elongate body provided with field joints 112 at either end thereof. The body is substantially circular in cross-section and increases in diameter towards the center section 114 thereof. A passage (not shown) is provided to allow control wires to pass through the body and allow tool control and data signals to pass through the body. The body comprise a cavity filled with a damping porous medium or just a damping medium depending on required performance of the attenuator. The outer skin of the body is formed from a rigid perforated shell which is covered with a thin, flexible sealing membrane which allows pressure communication between the borehole and the interior of the body. The cavity is filled with a medium whose role is to damp any acoustic waves. One porous damping medium suitable for use is compressed metal fiber saturated with silicone oil having a viscosity of, for example, 100 centistokes.

The shape of the attenuator modules of FIG. 7 can be applied to the attenuators described previously to improve their effect and reduce reflection which may occur with sharp changes in acoustic impedance in the borehole. The shape essentially comprises two exponential horn attenuators (simplified to a base-to-base conical shape) which adapt the impedance of the attenuator to the borehole propagating medium. Where the body is relatively long, it is only necessary to shape the end portions to effect the gradual impedance change.

We claim:

1. Apparatus for use in a borehole comprising an acoustic wave attenuator which comprises a body which is formed from a permeable material having a substantially rigid matrix having insignificant compressibility under typical borehole pressures and is positionable in the borehole so as to be in pressure communication with fluid in the borehole.

2. Apparatus as claimed in claim 1, wherein the porous material is natural rock.

3. Apparatus as claimed in claim 1, wherein the porous material is synthetic rock.

4. Apparatus as claimed in claim 1, wherein the porous material is a sintered particulate material.

5. Apparatus as claimed in claim 1, wherein the body is enclosed by a flexible sheath.

6. Apparatus as claimed in claim 5, wherein the permeable material is saturated with a liquid.

7. Apparatus as claimed in claim 1, wherein the body is elongate.

8. Apparatus as claimed in claim 1, wherein the body has a substantially smaller diameter than the borehole.

9. Apparatus as claimed in claim 1, wherein the body is surrounded by an apertured protective sleeve.

10. Borehole logging apparatus comprising:
 a) a source of acoustic signals;
 b) an acoustic attenuator comprising a body formed from a permeable material having a rigid matrix having insignificant compressibility under typical borehole pressures; and
 c) a receiver for acoustic signals.

11. Borehole logging apparatus as claimed in claim 10, wherein the attenuator attenuates tube waves which travel from the source along the borehole to the receiver.

12. Borehole logging apparatus as claimed in claim 10, wherein the attenuator has a smaller diameter than the borehole.

13. Borehole logging apparatus as claimed in claim 10, wherein the source is a monopole source.

14. Borehole logging apparatus comprising:
 a) a source of acoustic signals;
 b) a receiver for acoustic signals spaced from the source; and
 c) a plurality of acoustic attenuators, each comprising a body formed from a permeable material having a substantially rigid matrix having insignificant compressibility under typical borehole pressures, disposed between the source and the receiver.

15. A borehole acoustic attenuator, comprising an elongate body including an attenuative permeable material having insignificant compressibility under typical borehole pressures, the body having an acoustic impedance which increases towards a central portion of the body.

16. An attenuator as claimed in claim 15, wherein the increase in acoustic impedance is provided by a body of increasing in diameter towards the central portion thereof.

17. An attenuator as claimed in claim 15, wherein the shape of the body comprises two cones in a base-to-base relationship.

18. An attenuator as claimed in claim 15, wherein the body comprises a hollow shell filled with an attenuating medium.

19. An attenuator as claimed in claim 18, wherein the shell is rigid and perforated, a flexible sheath being provided over the surface of the shell to allow pressure communication with the borehole.

20. An attenuator as claimed in claim 18, wherein the attenuating medium comprises compressed metal fibers saturated with a viscous fluid.

* * * * *